Feb. 27, 1973  C. P. ABBOTT III, ET AL  3,718,842

LIQUID CRYSTAL DISPLAY MOUNTING STRUCTURE

Filed April 21, 1972  Sheets-Sheet 1

Feb. 27, 1973   C. P. ABBOTT III, ET AL   3,718,842
LIQUID CRYSTAL DISPLAY MOUNTING STRUCTURE
Filed April 21, 1972   2 Sheets-Sheet 2

United States Patent Office 3,718,842
Patented Feb. 27, 1973

3,718,842
LIQUID CRYSTAL DISPLAY MOUNTING
STRUCTURE
Charles P. Abbott III, Dallas, and John M. Reilly, Garland, Tex., assignors to Texas Instruments Incorporated, Dallas, Tex.
Filed Apr. 21, 1972, Ser. No. 246,207
Int. Cl. H05k 1/64
U.S. Cl. 317—101 CC
4 Claims

ABSTRACT OF THE DISCLOSURE

A liquid crystal display mounting structure wherein the electrical contacts on the back side of a liquid crystal display panel are held in pressure contact with a flat flexible cable which provides electrical connection to a matrix of diodes within a pair of diode boats or holders; interconnections between the diodes and other circuits are provided by etched circuit boards.

The present invention relates to letter-number displays of the type used to indicate the output or results of instruments such as calculators, digital voltmeters, counters and the like. More particurlarly, the present invention relates to a mounting structure for mounting a liquid crystal display panel together with the necessary operating components to effect a visual display.

Modern integrated electronic circuits using large-scale integration techniques have made it possible to provide in a single integrated circuit all of the electronic functions necessary for a complete system such as, for example, a complete electronic calculator capable of addition, subtraction and multiplication and division. Consequently, the size of such devices is no longer limited by space requirements for the electronic components but is limited now by such factors as the space required for batteries or power supplies, the minimum size of input devices such as keyboards, and output devices such as numeric displays which will not impair the user's efficient operation of the device because of their small size.

Liquid crystal displays are in many ways well suited as output devices but until now have been limited in their use partly because of difficulties in making the large number of necessary electrical connections between the liquid crystal display panel and other components of the system. One liquid crystal display panel now developed is about 2¾" long by about 1¹⁄₁₀" wide and is capable of displaying nine characters with decimal. For such a panel between 75 and 80 electrical contacts to the panel are required within a space of less than one square inch. Previously, individual wires were connected to each contact by hand, the other ends of the wires being connected to the individual diodes of a matrix which, in turn, were wired to a connector or etched circuit board. Initial assembly as well as repair and replacement of parts in such an assembly was difficult because of the large number of connections and wires in a very limited space.

Therefore, it is one object of the present invention to provide a liquid crystal display mounting structure which is compact and easy and inexpensive to assemble.

It is a further object of the present invention to provide a liquid crystal display mounting structure which can be readily isassembled to facilitate repair or replacement of its component parts.

These, together with other objects and advantages will become readily apparent from the following detailed description and accompanying drawings wherein.

Figure 1:
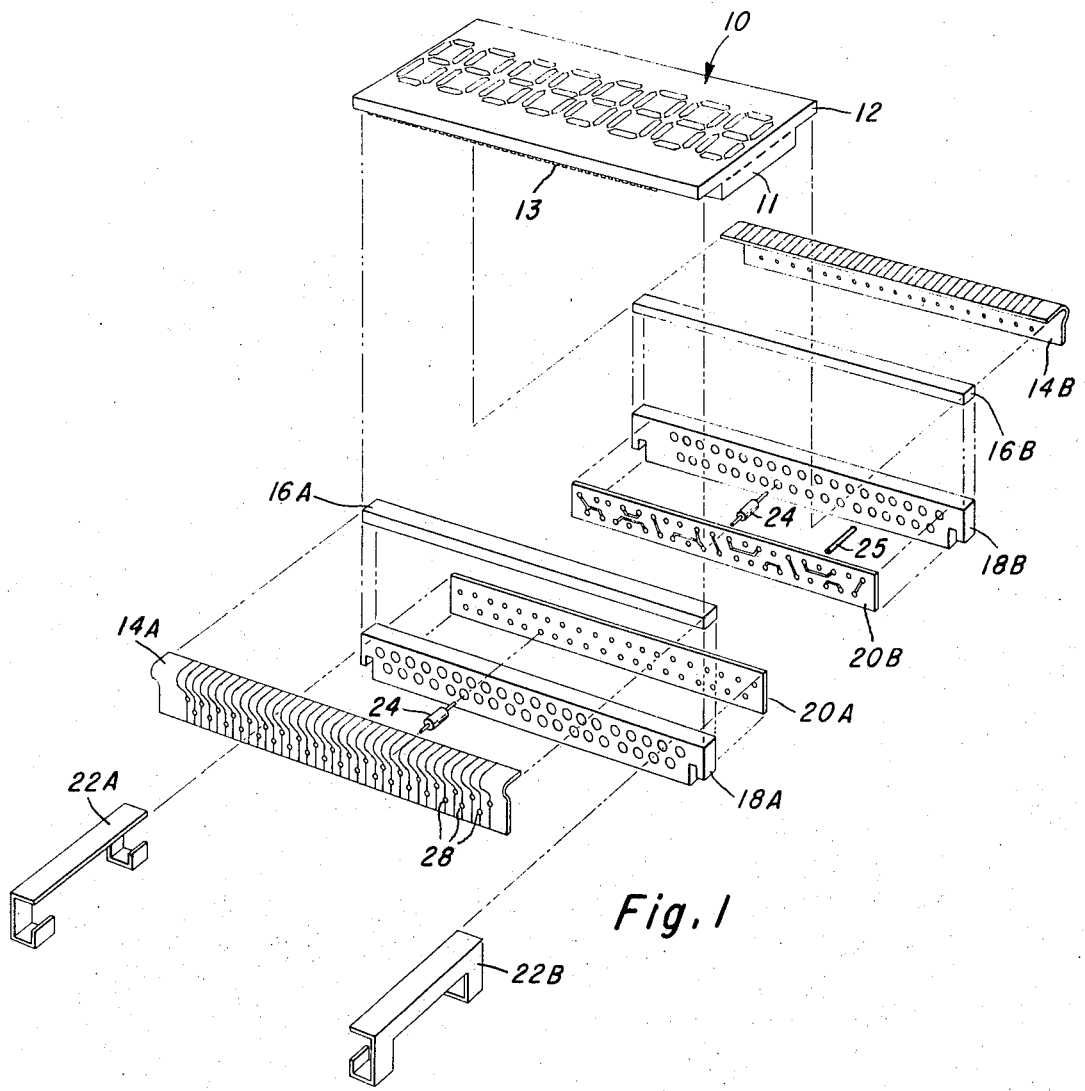
FIG. 1 is an exploded view of the mounting structure of the present invention.
Figure 1A:
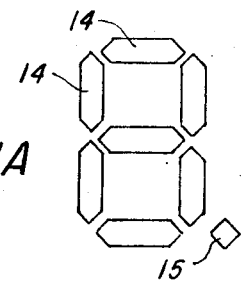
FIG. 1a illustrates an electrode arrangement for displaying any number from 0 through 9.

Illustrated in FIG. 1 is a liquid crystal display panel 10. The panel comprises a back plate 11 and a front plate 12 which is slightly wider than the back plate. The plates are separated from each other a short distance by a spacer around the periphery of the back plate. Between the plates is a thin cavity filled with a crystalline liquid of the type now well-known. On the inside surfaces of the front and back plates are conductive regions or electrodes which are arranged in patterns and groups so that numbers or letters are displayed by the panel upon excitation of the crystalline liquid by application of electrical current to selected ones of the electrodes. Electrical contacts to the various electrodes is by means of a conductive lead pattern on the back side of the front plate shown in phantom at 13. Each lead of the pattern extends from one of the electrodes within the panel through the seal between the plates to one of the overhanging ledges of the front plate. Two electrical contacts are required for excitation of each segment of each figure of the panel. For example, any of the numerals 0 through 9 may be displayed using selective excitation of the electrodes 14 arranged as shown in FIG. 1A; one additional electrode 15 may be used for a decimal point. Two electrodes are required for each segment of the figure but one of the electrodes may be a common electrode for all of the segments of a single figure, usually the back electrode. Thus, it may be seen that nine contacts are required for each digit of a numerical-decimal display. An eight-digit display panel then requires seventy-two individual connections to the liquid crystal panel.

It can be seen that the area to which electrical contact can be made to each of the conductive leads is quite small and that the conductive leads must be very closely spaced on a panel which has overall dimensions of only 2¾" x 1¹⁄₁₀". Further, when the panel is to be excited by a strobing or multiplexing technique, that is, each digit excited in turn sequentially repeatedly for short periods of time, it is often desirable or necessary to connect a diode in series with each of the front electrode segments.

Shown in the figures is the liquid crystal display mounting structure of the present invention. As shown, the mounting structure comprises the liquid crystal display panel 10 having a conductive pattern of leads 13 on the underside of the top plate, a pair of flat flexible cables 14a and b, a pair of rubber spacers 16a and b, a pair of diode holders or boats 18a and b, a pair of etched circuit boards 20a and b, and a pair of spring clips 22a and b.

Figure 2:
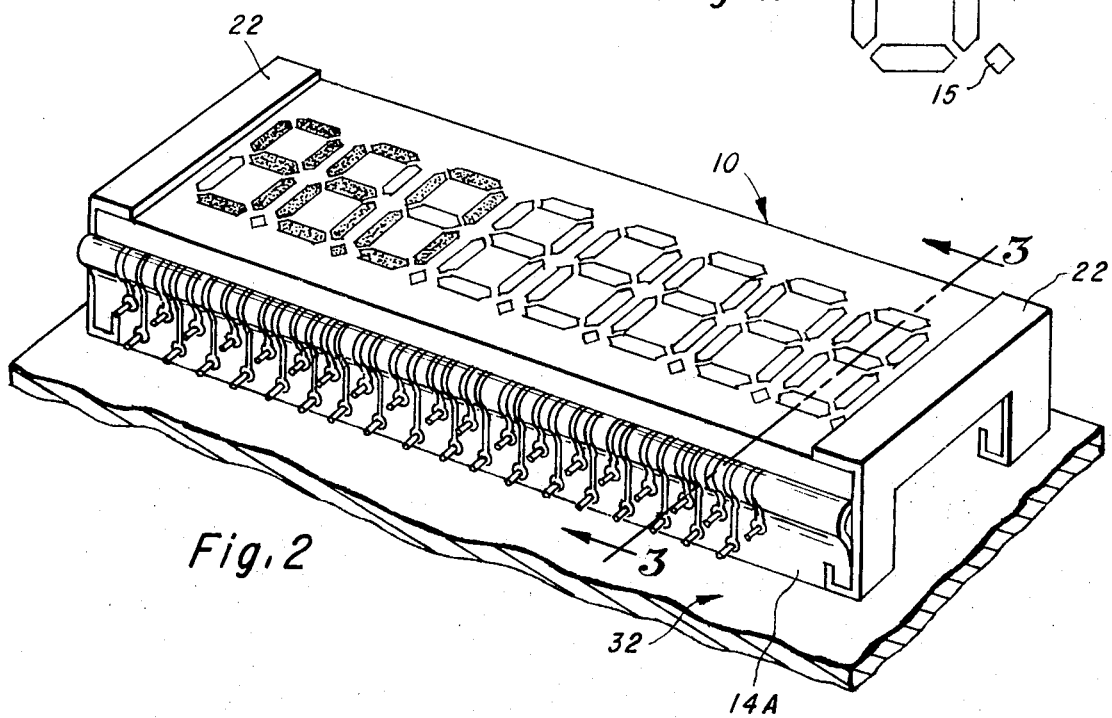
FIG. 2 is a view in perspective of the assembled structure.
Figure 3:
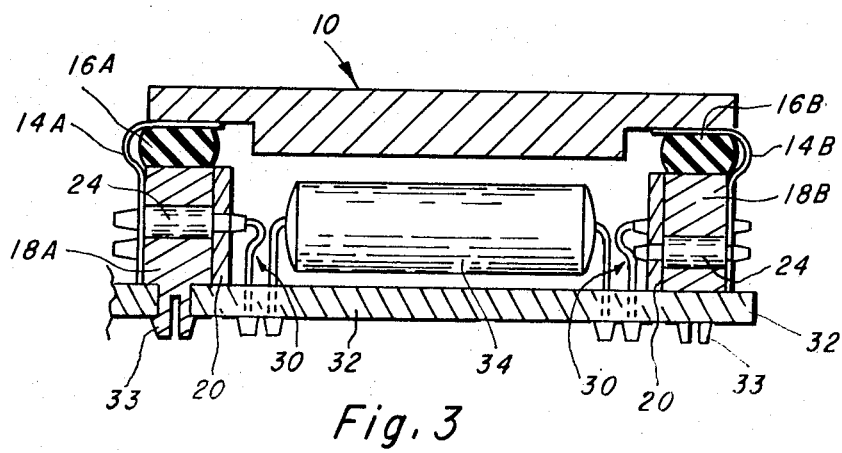
FIG. 3 is a view in section of the structure taken along lines 3—3 of FIG. 2.

When assembled, the liquid crystal panel 10 rests on top of the flat flexible cables 14 with the metallization pattern of the cable in matching contact with the conductive lead pattern 13 of the liquid crystal panel. Such flat flexible cables are commercially available or can be custom-made from a metallized sheet of plastic such as Mylar by etched circuit techniques. The spacers 16 which may be of rubber or other suitable resilient material are positioned under the flexible cables and rest on the diode boats or holders 18. The diode boats are made of a suitable insulating material such as phenolic or insulating plastic. Small glass diodes 24 are positioned in the holes 26 of the boat holders. Plain wire segments 25 may be used for through connections when diodes are not a circuit requirement. The other ends of the flexible cables have small holes 28 in the leads of the metallization pattern arranged to fit over and make contact with the diode leads or wires which protrude past the outer surfaces of the diode holders as shown in FIG. 2. Good electrical and structural contact between the diode leads and the flat flexible cable leads can be achieved either by soldering or by a spot of conductive epoxy glue at each contact. Etched or connecting circuit boards 20 having an appropriate metallization pattern and hole pattern are placed against the inner surfaces of the diode boats with the diode leads extending through the holes in the etched circuit board as best shown at 30 FIG. 3. The diode leads may be conductively connected to the circuit board metal pattern by solder or conductive epoxy glue in the same manner used to connect the diodes to the flexible cables. Spring clips 22 hook under each end of each of the diode boats and over the liquid crystal panel to hold the entire assembly together.

The liquid crystal display assembly can then be mounted by appropriate means, such as screws threaded into the bottom surfaces of the diode boats. As shown in FIG. 2, the display assembly is mounted onto a main circuit board 32 by detent fastener 33 leaving room beneath the display for the integrated circuits such as shown at 34 which provide the electronic functions of the system. System interconnections are provided by a metallization pattern on the main circuit board. Electrical connections between the display assembly and the main circuit board may be provided through a connector socket (not shown) in the main circuit board or by direct connection of the diode leads extending through the display assembly circuit boards to the main circuit board as illustrated.

Thus it can be seen that the display assembly of the present invention can be easily disassembled for repair and/or replacement of parts. Removal and replacement of the display panel, the part most vulnerable to damage, is especially easy. However, should it be desirable, the display panel connections may be more permanently affixed to the leads of the flat flexible cable by placing a small amount of conductive epoxy glue on each lead of the cable in an area where it is to contact the conductive leads of the display panel before assembly.

Thus, there has been disclosed a new liquid crystal display assembly structure which is easily and inexpensively constructed and which may be easily disassembled for repair or replacement of parts. Many modifications and changes will immediately be obvious to those familiar with such structures which are still within the spirit and scope of the present invention. Therefore, it is intended that this invention be limited only as set forth in the following claims.

What is claimed is:

1. A liquid crystal display assembly comprising:
   (a) a liquid crystal display panel having on its back surface a plurality of conductive areas providing electrical access to the internal electrodes of said panel;
   (b) a pair of flat flexible multiconductor cables having the conductors at at least one end spaced for a matching relationship between the conductors and respective conductive areas of said panels;
   (c) a pair of resilient spacer members;
   (d) a pair of rigid component holders having cavities therein adapted to support a plurality of components in fixed space relationship to one another with electrical leads of said components extending from opposite faces of said holders;
   (e) a pair of connecting circuit boards, each having a pattern of holes therein in a pattern matching said cavities of said component holders;
   (f) a plurality of circuit components positioned in the cavities of said component holders; and
   (g) a pair of spring clips holding the foregoing elements in assembly through engagement of each clip with the top of said panel at one end and the underside of each of said component holders at one end thus urging said component holder, said spacer and said flat cable against said panel with the conductors of said cable making electrical contact with respective conductive areas of said panel, the other ends of said conductors being connected to leads of said components, the other leads of said components being attached to said connecting circuit boards positioned against the faces of said component holders.

2. The liquid crystal display assembly as defined in claim 1 wherein said components comprise diodes and wires.

3. The liquid crystal display assembly of claim 1 wherein the conductors of said flat flexible cable are affixed to respective conductive areas of said panel by conductive epoxy glue.

4. The liquid crystal display assembly of claim 1 wherein said connecting circuit boards have conductive paths thereon providing electrical interconnection between selected ones of said components.

References Cited

UNITED STATES PATENTS

| | | | |
|---|---|---|---|
| 3,161,867 | 12/1964 | Isborn | 250—213 A |
| 3,340,437 | 9/1967 | Fricker, Jr. | 317—101 CW |
| 3,505,570 | 4/1970 | Sprude et al. | 317—101 CW |
| 3,638,033 | 1/1972 | Johnson et al. | 339—176 MP |

DAVID SMITH, JR, Primary Examiner

U.S. Cl. X.R.

250—213 A; 315—169 R; 317—101 CM, 101 F; 350—160